July 11, 1950 A. J. RACK 2,514,671

DECODER FOR PULSE CODE MODULATION

Filed Sept. 23, 1947

INVENTOR
A. J. RACK
BY George C. Ford
ATTORNEY

Patented July 11, 1950

2,514,671

UNITED STATES PATENT OFFICE 2,514,671

DECODER FOR PULSE CODE MODULATION

Alois J. Rack, Millington, N. J., assignor to Bell Telephone Laboratories, Incorporated, New York, N. Y., a corporation of New York Application September 23, 1947, Serial No. 775,633

11 Claims. (Cl. 250—27)

This invention relates to receivers for communication systems and more particularly to decoders for use in the receiving equipment of communication systems employing pulse code modulation.

In communication systems utilizing what is known as pulse code transmission, a speech wave or other signal to be transmitted is sampled periodically to ascertain its instantaneous amplitude which is expressed by a pulse code analogous to a telegraph code.

One code which conveniently may be employed in pulse code transmission involves permutations of a fixed number of code elements each of which may have any one of several conditions or values. An advantageous code of this type is the so-called binary code in which each of the fixed number of code elements may have either of two values. One advantageous way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is equal to $2^n$ where $n$ is the number of code elements employed.

Because the total number of different amplitudes which may be represented by such a code of a fixed number of elements is limited, it is found desirable to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission the instantaneous amplitude ascertained by the sampling operation is represented by the respective permutation indicative of the amplitude range, or step, which most nearly approximates the amplitude of the measured sample. If, for example, the sample amplitude is nearest to that amplitude represented by the ninth step of the total amplitude range the permutation code corresponding to range 9 is transmitted.

It will be observed that each code element in one of its values represents the presence in the sampled amplitude of a particular fixed portion of the total amplitude range, while in the other value it represents the absence of that same portion.

At the receiving station such code groups are employed for reconstructing the sample amplitudes which they respectively represent. In the decoding process each of the code element pulses which is of the value representing the presence of a particular portion of the total amplitude range is weighted in accordance with the amplitude portion which it represents and the weighted pulses are combined to obtain a single pulse which is proportional to the sample amplitude. Successive reconstructed sample amplitude pulses are then combined to reconstruct the original signal wave.

Various devices have been provided for performing the decoding process. One efficient device for use when the code pulses are sent in time sequence particularly with the pulse representing the smallest amplitude portion transmitted first is that disclosed in French Patent No. 960,862, issued November 7, 1949. The decoding system disclosed in the patent referred to above is arranged to decode code groups in which "on" pulses represent the presence in the sampled amplitude of a fixed portion of the total amplitude range. The pulses of the received code group are applied to a storage and discharge circuit, each "on" pulse being employed to produce a predetermined change in the amount of charge stored in the storage circuit. The time constant of the circuit is so chosen that in the interval between successive code element pulses the total amount of charge in the storage circuit changes at an exponential rate to a value which is related to the value at the beginning of the interpulse interval by a factor of 2. At the completion of a code group the total charge then present in the storage circuit is sampled. The sample amplitude so obtained represents the sum of the changes in charge produced by the several code pulses. If, for example, a code group of 7 code elements is employed and the contribution due to an "on" pulse received in the final code element position is taken at the time of sampling to equal $\frac{1}{2}$ the total amplitude range, the contributions due to received code pulses of the "on" value in successively earlier code element positions may represent respectively $\frac{1}{4}$, $\frac{1}{8}$, $\frac{1}{16}$, $\frac{1}{32}$, $\frac{1}{64}$ and $\frac{1}{128}$ total amplitude range. Thus, any amplitude within the total amplitude range acceptable by the system may be represented to within $\frac{1}{128}$ the total range.

The efficient operation of the decoding arrangement described above depends upon the accurate spacing of the code element pulses and upon the precise timing of the sampling operation. This will be understood from a consideration of the fact that variations of the positions of the code element pulses away from their assigned positions result in the changing of charge in the storage circuit at times other than those at which the specified exponential changes in charge from the preceding interpulse intervals have occurred. Similarly, since the total stored charge varies continuously after the receipt of the last pulse of the code group, inaccuracies in the timing of the sampling operation with respect to the completion of the code group result in errors as to the sample amplitude represented by the code group.

Variations in the interpulse spacing or jitter of the pulses may occur in radio systems such as those often employed between the sending and receiving stations of a pulse code modulation system. The undesirable effect of such variations which are usually caused by noise potentials may be eliminated to some extent by precise clipping and limting of the received pulses. This solution of the problem involves the provision of additional circuits in the synchronizing equipment at the receiving station. The accurate timing of the sampling operation in relation to the times of the received pulses places severe requirements on the synchronizing systems, necessitating complex circuit arrangements.

Accordingly it is an object of the present invention to eliminate the need for precision timing circuits in pulse code modulating systems employing decoders of the type described above. It is an additional object of the invention to improve the performance of such decoding circuits by reducing errors caused by variations in the timing of code element pulses and sampling operations.

In accordance with the present invention the exponential characteristic relating time and change of charge on the decoder storage circuit during the interpulse intervals is modified to provide inflection points during which the slope of the characteristic is essentially zero. Such inflation points are caused to occur at intervals equal to the interval between the code element pulses and the sampling operation is performed at times corresponding to such inflection points.

The above and other features of the invention may be understood from a consideration of the following detailed specification taken in connection with the drawings in which.

In an illustrative embodiment of the invention, the storage circuit of the decoder referred to above is modified through the addition to the RC storage circuit of a damped antiresonant circuit the frequency of which is related to the code element pulse repetition frequency. Thus a damped sinusoidal component may be added to the exponential characteristic of the RC circuit.

Figure 1:
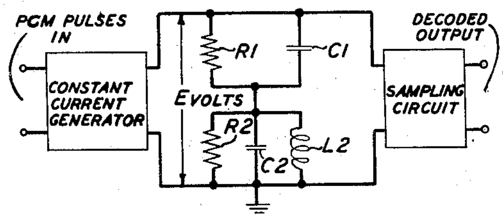
Fig. 1 is a schematic diagram partially in block form of a decoding circuit in accordance with the invention.

Referring now to Fig. 1 the RC portion of the storage circuit comprises a capacitor $C_1$ and a resistor $R_1$ connected in parallel. A damped antiresonant or oscillatory circuit is connected in sesies with the exponential discharge circuit, the antiresonant circuit comprising a capacitor $C_2$, a resistor $R_2$ and an inductor $L_2$ connected in parallel. This series combination is connected to the output of a constant current generator which applies a predetermined amount of charge to the storage circuit in response to each code element pulse of the value representing the presence of a portion of amplitude of the signal wave. A sampling circuit is also connected across the storage circuit and is enabled at an appropriate time following the completion of a code group to provide an output signal representative of the total amount of charge present in the storage circuit at the time of sampling.

Considering the effect of a single code pulse upon the storage circuit it will be seen that in response to such a pulse both sections of the storage circuit are excited simultaneously. In the section comprising capacitor $C_1$ and resistor $R_1$ a fixed amount of charge is added to the circuit after which the potential thereacross decays exponentially substantially as shown in curve 10 of Fig. 3. At the same time the damped antiresonant circuit comprising capacitor $C_2$, resistor $R_2$ and inductor $L_2$ is excited and a damped sine wave appears thereacross. This damped sine wave is shown in curve 12 of Fig. 3.

Figures 3, 5:
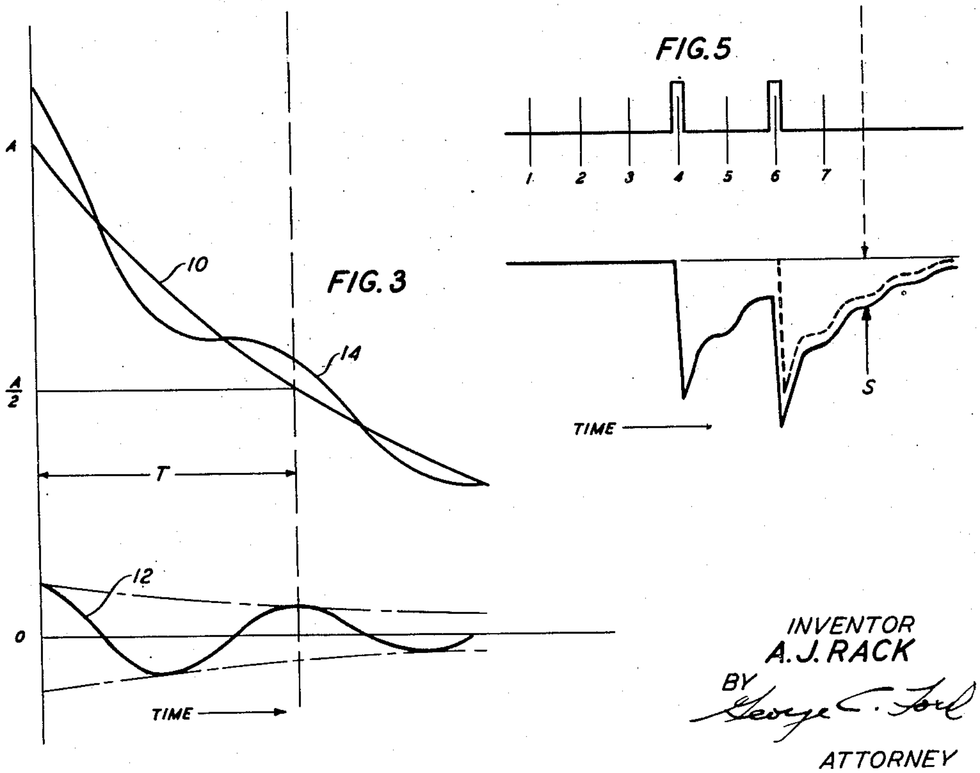
Fig. 3 is a graph showing the relationships between certain quantities in the decoding circuit of Fig. 1.
Fig. 5 is a graph illustrating operation of the decoder of the invention.

By appropriate adjustment of the parameters of the storage circuit, the characteristic curve 10 of the RC circuit and the curve 12 of the damped antiresonant circuit may be so proportioned that their sum takes the form shown in curve 14 of Fig. 3. In this curve, which represents the characteristic of the decoding circuit of Fig. 1, inflection points of substantially zero slope occur at intervals which may be made equal to the interpulse intervals of the code groups. It will be recognized that the effects of timing errors may be greatly reduced if the sampling operation is performed at one of the zero slope portions of the characteristic. Since these portions of the characteristic are of finite duration, the time of sampling may vary over a considerable range without causing errors in the value of the sample amplitude. Assuming that the timing of the code element pulses is correct, the time of sampling may vary over a period equal to the entire duration of the inflection in the characteristic. Similarly, if the sampling time is correct, the cumulative error in the timing of the code element pulses may vary over the same range. If both the sampling and code element pulse times are varied, the sum of the timing errors may approach the duration of the inflections of the characteristic without producing decoding errors.

The circuit constants required for the production of the desired characteristic may be determined experimentally or by mathematical analysis. Thus the characteristic due to the RC circuit may be expressed by:

$$E_1 = Ve^{-\alpha_1 t}$$

and that due to the antiresonant circuit by:

$$E_2 = Ae^{-\alpha_2 t} \sin \omega t$$

In the mathematical analysis, the expression for the sum of these two components is twice differentiated, and a solution is found such that both the first and second derivates are zero.

It may be shown that in order to obtain the desired characteristic as shown in curve 14 of Fig. 3 the frequency $$f = \frac{1}{2\pi\sqrt{L_2C_2}}$$

must be made equal to the pulse repetition frequency of the code element pulses. Similarly it may be shown that the decrement $$\alpha_1 + \frac{1}{R_1C_1}$$

of the RC storage circuit must equal that of the antiresonant circuit $$\alpha_2=\frac{1}{2R_2C_2}$$

and that the amplitude A of the damped sine wave must equal 11 per cent of the amplitude V of the exponential wave.

The relation between the exponential and damped since wave components of the storage circuit characteristic will be varied to some extent by variations of the length and shape of the pulses from the constant current generator. Appropriate changes may be made, however, in the constants of the antiresonant circuit to maintain the relationships set forth above.

Figure 2:
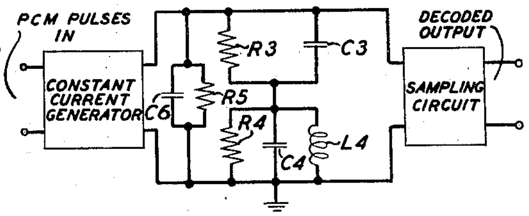
Fig. 2 is a schematic diagram partially in block form showing a modification of the arrangement of Fig. 1.

As indicated above, appropriate values for the parameters of the storage circuits may be obtained either experimentally or mathematically. It will be found, however, that theoretically derived values must be modified to account for the internal impedance of the constant current source employed to charge the storage circuit and the impedance of other apparatus associated with the storage circuit. A suitable arrangement for producing such compensation is shown in Fig. 2 in which the parallel combination of a resistor $R_5$ and a capacitor $C_6$ is connected in parallel with the storage circuit across the constant current source. Since the components of the storage circuit must then have different values they are relabelled $R_3$, $C_3$ for the exponential circuit and $R_4$, $C_4$, $L_4$ for the antiresonant circuit. Through the use of well known impedance transformations the following relationships between the values of $C_1$, $C_2$, $R_1$, and $L_2$ of Fig. 1, and $C_3$, $C_4$, $R_3$, $R_4$, $R_5$ and $L_4$ of Fig. 2 may be obtained in terms of the quantity $C_5$ which represents the sum of the internal impedance of the source and associated apparatus and $C_6$, the compensating impedance.

$$C_3=C_1-C_5$$

$$C_4=\left(\frac{C_1-C_5}{C_1}\right)^2 C_2-C_5\left(\frac{C_1-C_5}{C_1}\right)$$

$$L_4=\left(\frac{C_1}{C_1-C_5}\right)^2 L_2$$

$$R_3=\left(\frac{C_1}{C_1-C_5}\right) R_1$$

$$R_4=\frac{\left(\frac{C_1}{C_1-C_5}\right)^2}{1-\frac{1}{2}\,\frac{C^5}{C_1-C_5}\,\frac{C_1}{C_2}}$$

$$R_5=\frac{C_1}{C_5} R_1$$

It may be shown experimentally that $R_5$ can be eliminated without affecting the operation of the system providing suitable changes are made in the values of the remaining circuit components. However, the inclusion of $R_5$ greatly simplifies the impedance transformations necessary for the specification of the other components. The actual circuit values for all of the components of a practical embodiment of the invention may be computed from the above equations which express them in terms of the elements of the theoretical circuit of Fig. 1.

Figure 4:
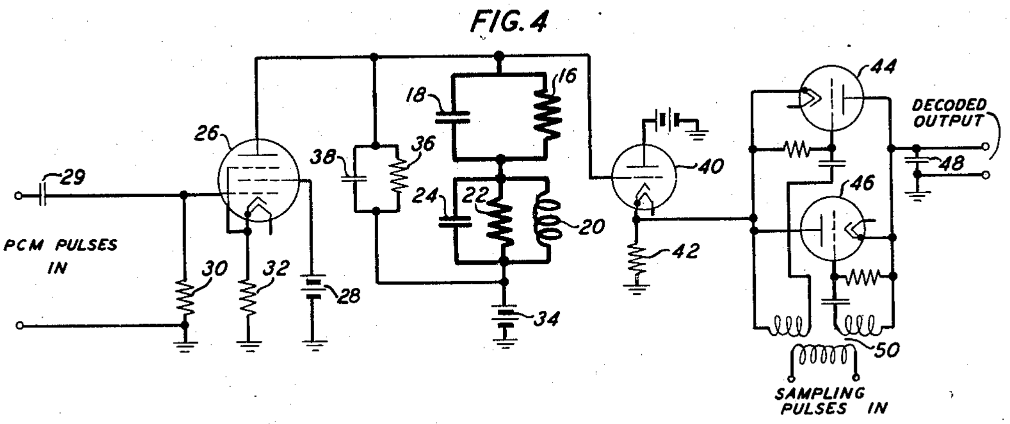
Fig. 4 is a schematic diagram of the decoder shown in Fig. 1.

An illustrative embodiment of an improved decoder in accordance with the invention is shown in schematic form in Fig. 4. In this embodiment the storage circuit comprising the series combination of resistor 16 and capacitor 18 in parallel and inductor 20, resistor 22 and capacitor 24 in parallel is connected in the anode circuit of a pentode-type vacuum tube 26 which is arranged to serve as a constant current generator. Accordingly, a fixed positive potential obtained from battery 28 is applied to the screen grid of pentode 26 while the pulse code modulation pulses are applied through a coupling capacitor 29 to the control grid, the usual grid return being furnished by resistor 30. The cathode of pentode 26 is connected to ground through an unbypassed resistor 32 while the anode is connected through the storage circuit to the positive terminal of an anode supply battery 34.

It is well known that a pentode-type tube with a fixed screen potential constitutes a reasonably efficient constant current source. The performance of this tube as a constant current source is further enhanced through the use of the unbypassed cathode resistor 32 which adds the benefits of negative feedback. The internal capacitance of the pentode tube and the associated circuit elements is compensated by the network including resistor 36 and capacitor 38 connected in parallel across the output of pentode 26.

Each time an "on" code element pulse is received, a pulse of constant current is applied to the storage circuit from anode battery 34. This excites the two sections of the storage circuit which then discharges as shown in curve 14 of Fig. 3 Each successive "on" code element pulse causes the further excitation of the storage circuit. The cumulative effect may be represented by the diagram of Fig. 5. Here as an example there is assumed a code group of seven elements in which the fourth and sixth code element pulses are "on" pulses and the remainder are "off" pulses. The "off" pulses are not effective to produce any change in the charge in the storage circuit. Upon receipt of the fourth pulse which is an "on" pulse the storage circuit is charged negatively to a predetermined value. The charge begins to decay at once and in the absence of additional pulses would reach a value at the sampling time (indicated by the arrows in Fig. 5) equal to $\frac{1}{16}$ the total range. Before the charge decays to this value, however, an additional charge of the same predetermined value is added to the circuit in response to the sixth pulse which is also an "on" pulse. The total charge is increased but begins again to decay as shown in Fig. 5. In the absence of the charge due to the fourth pulse, that due to the sixth pulse would cause the charge to vary as shown by the dashed line in Fig. 5, reaching a value at the time of sampling representing $\frac{1}{4}$ the total amplitude range. The components due to the fourth and sixth pulses add, however, giving a value at the time of sampling representing $\frac{1}{16}+\frac{1}{4}$ or $\frac{5}{16}$ the total range of the system.

After the charge in the storage circuit has decayed to zero, the circuit is ready to decode another code group. Since the code groups are usually sent in succession with little or no interval between groups, it becomes necessary, in the application of this type of decoder, either to provide means for rapidly discharging the storage circuit immediately after the sampling operation or to provide one or more additional decoders which may be utilized in turn to decode successive code groups.

The voltage across the storage circuit is applied to the control grid of a triode-type tube 40 which is connected as a cathode follower amplifier and the output of this tube, appearing across cathode resistor 42, is applied to a sampling circuit. This cathode follower stage is employed to avoid loading down the storage circuit by the input impedance of the sampling equipment.

The sampling circuit may be of any suitable type such that a quantity proportional to the voltage across the storage circuit may be produced at predetermined instants. As shown herein the sampler comprises triodes 44 and 46 connected back to back between the cathode of cathode follower 40 and a storage capacitor 48. Normally, the flow of current through triodes 44 and 46 is cut off but these tubes may be enabled at predetermined times by the application of sampling pulses which are applied through transformer 50. This transformer has dual secondary windings which are included in the grid circuits of triode tubes 44 and 50 respectively. During sampling pulses triodes 44 and 46 are made conductive and the voltage across storage capacitor 48 is made equal to that of the cathode of cathode follower 40. Between sampling pulses triodes 44 and 46 are cut off and the voltage across storage capacitor 48 is held at the value which it had at the conclusion of the preceding sampling pulse. This type of circuit is sometimes referred to as a clamping circuit. Thus it will be understood that an output voltage may be obtained from storage capacitor 48 which is a measure of the voltage across the decoding storage circuit at the time of sampling and is thus a measure of the sample amplitude applied to the decoding circuit during the preceding interval.

In the above embodiment a single sinusoidal component is added to the discharge characteristic of the RC storage circuit to obtain an approximation of a stepped discharged wave. This modification is capable of effecting large reductions in the errors due to imperfect timing. Additional imrovements in performance may be obtained by adding other harmonically related sinusoidal components to the discharge characteristic, the amplitudes and decrements of these components being related to those of the exponential wave. Such components may be added by provision of additional damped antiresonant circuits, similar to that employed in the described embodiment, in series with the RC discharge circuit.

Freedom from the effects of pulse jitter may also be obtained from the use of harmonically related sinusoidal components without the RC exponential component by sampling the resulting decoder voltage waveforms in the center of the resulting flat regions. However, the use of the sinusoidal voltage component with the RC exponential wave gives a greater reduction in the decoder errors with a simpler circuit configuration.

What is claimed is:

1. In a system for decoding code groups of bi-valued pulses normally occurring at equal intervals, each pulse in one value representing a portion of the amplitude of a signal wave, a storage circuit having an exponential discharge characteristic such that during each of the interpulse intervals the energy is reduced to a predetermined fraction of that present at the beginning of the interpulse interval, means for storing a predetermined amount of energy in said storage circuit in response to each pulse of said one value, means in series with said storage circuit and responsive to each pulse of said one value for generating a damped sine wave, the period of which is related to the interpulse intervals of said bi-valued pulses and the amplitude and decrement of which are related to said discharge characteristic, and means for sampling the sum of the energies present in said storage and said sine wave generating circuits at predetermined times.

2. In a system for decoding code groups of bi-valued pulses normally occurring at equal intervals, each pulse in one value representing a portion of the amplitude of a signal wave, a storage circuit having an exponential discharge characteristic such that during each of the interpulse intervals the energy is reduced to a predetermined fraction of that present at the beginning of the interval, means for storing a predetermined amount of energy in said storage circuit in response to each pulse of said one value, a damped oscillatory circuit connected in series with said storage circuit for excitation by each pulse of said one value, the frequency of said oscillatory circuit being equal to the repetition rate of said bi-valued pulses and the amplitude and decrement of said circuit being related to the corresponding quantities of said storage circuit, and means for sampling the sum of the energies stored in said storage and oscillatory circuits at predetermined instants.

3. In a system for decoding code groups of bi-valued pulses normally occurring at equal intervals, each pulse in one value representing a portion of the amplitude of a signal wave, a storage circuit having an exponential discharge characteristic such that during each interpulse interval the energy is reduced to a predetermined fraction of that present at the beginning of the interval, means for storing a predetermined amount of energy in said storage circuit in response to each pulse of said one value, means in series with said storage circuit for generating a damped sine wave in response to each pulse of said one value, the frequency of the sine wave being equal to the repetition frequency of said bi-valued pulses, the decrement of said damped sine wave being equal to that of said exponential discharge circuit and the amplitude of said sine wave being equal to 11 per cent of that of the exponential wave of said storage circuit and means for sampling the total amount of energy stored in said storage and sine wave generating circuits.

4. In a system for decoding code groups of bi-valued pulses normally occurring at equal intervals, each pulse in one value representing a portion of the amplitude of a signal wave, a storage circuit having an exponential discharge characteristic such that during each interpulse interval the energy is reduced to a predetermined fraction of that present at the beginning of the interval, means for storing a predetermined amount of energy in said storage circuit in response to each pulse of said one value, a damped oscillatory circuit connected in series with said storage circuit for excitation by each pulse of said one value, the constants of said oscillatory circuit being so chosen that its period is equal to the inner pulse intervals, the amplitude of the sine wave is equal to 11 per cent of the exponential wave of said storage circuit and the decrement of the sine wave is equal to that of the exponential wave, and means for sampling the combined energy stored in said storage and oscillatory circuits.

5. In a system for decoding code groups of bi-valued pulses normally occurring at equal intervals, each pulse in one value representing a portion of the amplitude of a signal wave, an RC storage circuit having a discharge characteristic such that during each interpulse interval the energy is reduced to a predetermined fraction of that present at the beginning of the interval, means for storing a predetermined amount of energy in said circuit in response to each pulse of said one value, a damped antiresonant circuit connected in series with said storage circuit for excitation by said pulses of said one value, the period of the wave generated by said antiresonant circuit being related to the interpulse intervals and the amplitude and decrement of said antiresonant circuit wave being related to the corresponding quantities of the storage circuit output and means for sampling the total amount of energy stored in said storage and antiresonant circuits at predetermined instants.

6. In a system for decoding code groups of multivalued pulses normally occurring at equal intervals and each pulse in one value representing a portion of the amplitude of a signal wave, a first energy storage device having a characteristic such that during each interpulse interval the energy stored in the device is changed by a fixed fraction of that present at the beginning of the interval, a second energy storage device having a periodic characteristic with a period equal to said interpulse intervals, means for storing predetermined amounts of energy in each of said devices in response to each pulse of said one value, and means effective at predetermined times for sampling the sum of the energies stored in said devices.

7. In a system for decoding code groups of multivalued pulses normally occurring at equal intervals and each pulse in one value representing a portion of the amplitude of a signal wave, means responsive to each pulse of said one value to generate an exponential wave which, during each pulse interval, decays to one-half the amplitude existing at the beginning of the interval, means also responsive to each pulse of said one value to generate a second wave for combination with said exponential wave, said second wave having portions which occur at intervals equal to said interpulse intervals and have a slope which is supplementary to that of said exponential wave at these intervals, and means for sampling the amplitude of the sum of said waves at predetermined times.

8. In a system for decoding code groups of multivalued pulses normally occurring at equal intervals and each pulse in one value representing a portion of the amplitude of a signal wave, means responsive to each pulse of said one value to generate an exponential wave which, during each pulse interval, decays to one-half the amplitude existing at the beginning of the interval, means also responsive to each pulse of said one value to generate a second wave for a combination with said exponential wave, said second wave having portions which occur at intervals equal to the interpulse intervals and have a slope which is equal to that of said exponential wave but of opposite sign, and means for sampling the amplitude of the sum of said waves at times when the slope of the combined waves is substantially zero.

9. In a system for decoding code groups of multivalued pulses normally occurring at equal intervals each pulse in one value representing a portion of the amplitude of a signal wave, means responsive to each pulse of said one value to produce an exponential wave which, during each pulse interval, decays to a value one-half that present at the beginning of the interval, means also responsive to each pulse of said one value to produce a periodic wave having a period equal to said interpulse interval and having a slope at such intervals such that the combination of the two waves at these times has first and second derivatives which are simultaneously substantially zero, and means for sampling the sum of the two waves at said times.

10. In a system for decoding code groups of multivalued pulses normally occurring at equal intervals each pulse in one value representing a portion of the amplitude of a signal wave, a first energy storage device having a discharge characteristic such that during each interpulse interval the energy stored in the device is reduced by a fixed fraction of that present at the beginning of the interval, a second energy storage device having a discharge characteristic which varies periodically with a period equal to said interpulse intervals, a source of current impulses arranged to apply predetermined amounts of energy to each of said devices in response to each pulse of said one value, means for compensating the internal impedance of said source of current impulses, and means for sampling the sum of the energies in said devices at predetermined times.

11. In a system for decoding code groups of multivalued pulses normally occurring at equal intervals each pulse in one value representing a portion of the amplitude of a signal wave, a first energy storage device having a discharge characteristic such that during each interpulse interval the energy stored in the device is reduced by a fixed fraction of that present at the beginning of the interval, a second energy storage device having a discharge characteristic which varies periodically with a period equal to said interpulse intervals, a source of current impulses arranged to apply predetermined amounts of energy to each of said devices in response to each pulse of said one value, and an RC network connected across the inputs of said devices for compensating the internal impedance of said source.

ALOIS J. RACK.

REFERENCES CITED

The following references are of record in the file of this patent:

UNITED STATES PATENTS

| Number | Name | Date |
|---|---|---|
| 1,733,614 | Marrison | Oct. 29, 1929 |
| 2,277,000 | Bingley | Mar. 17, 1942 |
| 2,292,835 | Hepp | Aug. 11, 1942 |
| 2,419,772 | Gottier | Apr. 29, 1947 |
| 2,438,907 | Frankel et al. | Apr. 6, 1948 |